(12) United States Patent
Steeman et al.

(10) Patent No.: US 10,632,652 B2
(45) Date of Patent: Apr. 28, 2020

(54) MATERIAL SHEET AND PROCESS FOR ITS PREPARATION

(71) Applicant: DSM IP ASSETS B.V., Heerlen (NL)

(72) Inventors: Reinard Jozef Maria Steeman, Elsloo (NL); Marcel Jongedijk, Sittard (NL); Johann Van Elburg, Landgraaf (NL)

(73) Assignee: DSM IP ASSETS B.V., Heerlen (NL)

(*) Notice: Subject to any disclaimer, the term of this patent is extended or adjusted under 35 U.S.C. 154(b) by 0 days.

(21) Appl. No.: 16/248,668

(22) Filed: Jan. 15, 2019

(65) Prior Publication Data

US 2019/0152098 A1    May 23, 2019

Related U.S. Application Data

(62) Division of application No. 14/977,046, filed on Dec. 21, 2015, now abandoned, which is a division of (Continued)

(30) Foreign Application Priority Data

Oct. 31, 2007 (EP) .................................. 07021267
Jan. 31, 2008 (EP) .................................. 08001815

(51) Int. Cl.
*B29C 43/02* (2006.01)
*D02G 3/06* (2006.01)
(Continued)

(52) U.S. Cl.
CPC ............ *B29C 43/02* (2013.01); *B29C 43/003* (2013.01); *B29C 55/04* (2013.01); *B32B 5/022* (2013.01); *B32B 5/024* (2013.01); *B32B 5/028* (2013.01); *B32B 5/26* (2013.01); *B32B 7/12* (2013.01); *B32B 9/005* (2013.01); *B32B 9/007* (2013.01); *B32B 9/041* (2013.01); *B32B 9/047* (2013.01); *B32B 15/08* (2013.01); *B32B 15/14* (2013.01);
(Continued)

(58) Field of Classification Search
CPC ...................................................... B29C 43/02
See application file for complete search history.

(56) References Cited

U.S. PATENT DOCUMENTS 4,165,960 A   8/1979 Lemelson
4,290,248 A   9/1981 Kemerer et al.
(Continued)

FOREIGN PATENT DOCUMENTS

EP    0 191 306    8/1986
EP    0 205 960    12/1986
(Continued)

OTHER PUBLICATIONS

International Search Report for PCT/EP2008/009122, dated Mar. 3, 2009.
(Continued)

*Primary Examiner* — Andrew T Piziali
(74) *Attorney, Agent, or Firm* — Nixon & Vanderhye P.C.

(57) ABSTRACT

A material sheet is formed of a woven fabric of polymer tapes, wherein the width of a tape varies less than 2% on average in the longitudinal direction of the tape. Processes for the preparation of the material sheet, and to a ballistic resistant article comprising the material sheet are also provided. A ballistic resistant article which includes the material sheet exhibits excellent antiballistic properties.

22 Claims, 5 Drawing Sheets

Related U.S. Application Data application No. 12/740,475, filed as application No. PCT/EP2008/009122 on Oct. 29, 2008, now abandoned.

(60) Provisional application No. 61/001,096, filed on Oct. 31, 2007.

(51) Int. Cl.
  D03D 1/00 (2006.01)
  D03D 15/00 (2006.01)
  F41H 5/04 (2006.01)
  B32B 5/02 (2006.01)
  B32B 5/26 (2006.01)
  B32B 7/12 (2006.01)
  B32B 9/00 (2006.01)
  B32B 9/04 (2006.01)
  B32B 15/08 (2006.01)
  B32B 15/14 (2006.01)
  B32B 15/18 (2006.01)
  B32B 15/20 (2006.01)
  B32B 27/32 (2006.01)
  B29C 43/00 (2006.01)
  B29C 55/04 (2006.01)
  B29K 23/00 (2006.01)
  B29K 105/00 (2006.01)
  B29L 7/00 (2006.01)
  B29L 23/00 (2006.01)
  B29L 31/30 (2006.01)

(52) U.S. Cl.
  CPC ............ *B32B 15/18* (2013.01); *B32B 15/20* (2013.01); *B32B 27/32* (2013.01); *D02G 3/06* (2013.01); *D03D 1/0052* (2013.01); *D03D 15/00* (2013.01); *D03D 15/0088* (2013.01); *F41H 5/0435* (2013.01); *F41H 5/0464* (2013.01); *F41H 5/0471* (2013.01); *B29K 2023/0683* (2013.01); *B29K 2105/251* (2013.01); *B29K 2995/0089* (2013.01); *B29L 2007/007* (2013.01); *B29L 2023/005* (2013.01); *B29L 2031/3076* (2013.01); *B32B 2260/00* (2013.01); *B32B 2262/0223* (2013.01); *B32B 2262/0246* (2013.01); *B32B 2262/0253* (2013.01); *B32B 2262/0261* (2013.01); *B32B 2262/0276* (2013.01); *B32B 2262/101* (2013.01); *B32B 2262/106* (2013.01); *B32B 2307/50* (2013.01); *B32B 2307/54* (2013.01); *B32B 2307/72* (2013.01); *B32B 2435/00* (2013.01); *B32B 2439/00* (2013.01); *B32B 2605/18* (2013.01); *B32B 2607/00* (2013.01); *D10B 2321/02* (2013.01); *D10B 2321/06* (2013.01); *D10B 2321/10* (2013.01); *D10B 2331/02* (2013.01); *D10B 2331/04* (2013.01); *D10B 2401/062* (2013.01); *D10B 2401/063* (2013.01); *D10B 2505/00* (2013.01); *Y10T 442/3041* (2015.04)

(56) References Cited

U.S. PATENT DOCUMENTS

| | | |
|---|---|---|
| 4,708,839 A | 11/1987 | Bellet |
| 4,868,040 A | 9/1989 | Hallal et al. |
| 5,091,133 A | 2/1992 | Kobayashi et al. |
| 5,449,481 A | 9/1995 | Sagawa |
| 5,578,373 A | 11/1996 | Kobayashi |
| 5,619,748 A | 4/1997 | Nelson et al. |
| 6,010,141 A | 1/2000 | Huntimer |
| 6,119,575 A | 9/2000 | Dragone et al. |
| 6,450,208 B1 | 9/2002 | Khokar et al. |
| 6,951,685 B1 | 10/2005 | Weedom et al. |

FOREIGN PATENT DOCUMENTS

| | | |
|---|---|---|
| EP | 0 683 374 | 11/1995 |
| EP | 1 170 925 | 1/2002 |
| EP | 1 627 719 | 2/2006 |
| GB | 2 042 414 | 9/1980 |
| GB | 2 051 667 | 1/1981 |
| GB | 1 601 760 | 11/1981 |
| JP | 06 010233 | 1/1994 |
| WO | 93/15118 | 8/1993 |
| WO | 00/42246 | 7/2000 |
| WO | 01/73173 | 10/2001 |
| WO | 03/008190 | 1/2003 |
| WO | 2006/002977 | 1/2006 |
| WO | 2006/075961 | 7/2006 |
| WO | 2007/003334 | 1/2007 |

OTHER PUBLICATIONS

Nakajima, "Advanced Fibre Spinning Technology," Woodhead Publ. Ltd (1994), ISBN 185573 182.

Hercules Incorporated, PTC-179 IV, Test Method, Plastics, Determination of Intrinsic Viscosity, Rev. Apr. 29, 1982, pp. 1-21.

Weaved Place Mats, https://web.archive.org/web/20071015174311/http://origami-resource-center.com/weaved-place-mats.html.

MATERIAL SHEET AND PROCESS FOR ITS PREPARATION

CROSS-REFERENCE TO RELATED APPLICATIONS

This application is a divisional of commonly owned copending U.S. application Ser. No. 14/977,046 filed Dec. 21, 2015, which is a divisional of U.S. application Ser. No. 12/740,475 filed Apr. 29, 2010, which is the national phase application under 35 USC § 371 of PCT/EP2008/009122, filed Oct. 29, 2008, which designated the U.S. and claims priority to EP Patent Application No. 07021267.5, filed Oct. 31, 2007, U.S. Provisional Application No. 61/001,096, filed Oct. 31, 2007 and EP Patent Application No. 08001815.3, filed Jan. 31, 2008, the entire contents of each of which are hereby incorporated by reference.

FIELD

The invention relates to polymeric tapes and a process for the preparation thereof and further to a material sheet comprising the polymeric tapes, and to its process of preparation. The invention also relates to articles comprising the material sheet, in particular to a ballistic resistant article. The invention also relates to different uses of the polymeric tapes.

BACKGROUND AND SUMMARY

A material sheet comprising a consolidated stack of monolayers of a unidirectionally drawn polymer is known from EP 1627719 A1. This publication discloses a multi-layered material sheet comprising a plurality of unidirectional monolayers consisting of ultra high molecular weight polyethylene and essentially devoid of bonding matrices, whereby the draw direction of two subsequent monolayers in the stack differs. The monolayers of the multilayered material disclosed in EP 1627719 A1 are produced by positioning a plurality of tapes of ultra high molecular weight polyethylene adjacent to each other whereby adjacently positioned tapes overlap at least partly along their side edges. Without the overlap the known multilayered material cannot be produced.

Although the multilayered material sheet according to EP 1627719 A1 shows a satisfactory ballistic performance, this performance can be improved further.

The object of the present invention is to provide a material sheet that can be easily produced and having at least similar properties, in particular similar antiballistic properties, as the material known from EP 1627719 A1 or other commercially available materials based on unidirectional PE fibers.

This object is achieved according to the invention by providing a material sheet comprising a woven fabric of polymeric tapes, wherein the width of a tape varies less than 2% on average in the longitudinal direction of the tape. The tapes of the invention having such low variance of width in the longitudinal direction are preferably made by a process which comprises forming a polymeric powder bed, compression-moulding the polymeric powder bed at a temperature below the melting point of the polymeric powder, and preferably drawing the compression-moulded polymer, and wherein the powder bed is moulded by compression together with at least one compressible bordering means positioned onto the powder bed.

In one embodiment of the present invention, there is provided a process for the preparation of a material sheet comprising:

(a) providing a plurality of drawn polymer tapes, preferably unidirectional tapes, having a width that varies less than 2% on average in the longitudinal direction of the tape;

(b) weaving said plurality of drawn polymer tapes to form a woven fabric;

(c) compressing the thus formed woven fabric at least over an area adjacent to the longitudinal edges of the woven fabric to consolidate the area.

In another embodiment, the process is characterised in that, prior to step (c) the unidirectional tapes of the drawn polymer in the warp and weft direction of the woven fabric are at least partly adhered to each other, at least over an area adjacent to the longitudinal edges of the woven fabric, an example of which is depicted in the figures. In still another preferred process according to the invention, adhering the unidirectional tapes is performed by fusion bonding, and even more preferably by ultrasonic welding.

The invention moreover relates to the use of the tapes of the invention in woven material sheets and also in a weaving process for manufacturing material sheets.

BRIEF DESCRIPTION OF THE DRAWINGS

The invention will now be further explained by the following FIGS. 1-6, without however being limited thereto.

DETAILED DESCRIPTION

Figure 1:
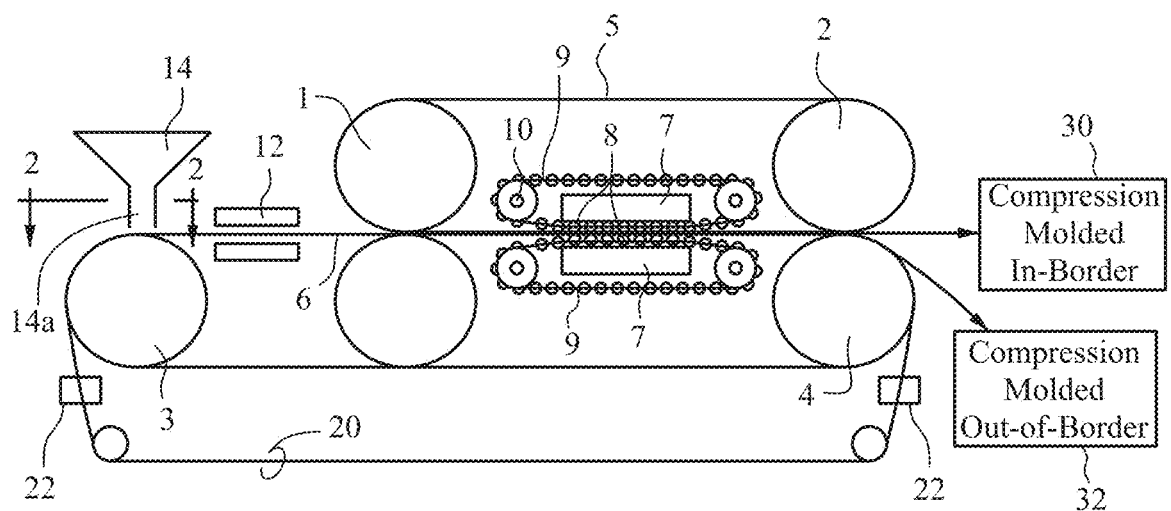
FIG. 1 is a simplified schematic illustration showing the outline of an apparatus useful in the practice of the production process according to the invention.

The polymeric tapes of the invention, more simply referred to as tapes, are preferably tapes of a drawn polymer; more preferably, the tapes are unidirectional tapes of a drawn polymer. With unidirectional tapes is meant in the context of the invention tapes which show a preferred orientation of the polymer chains in one direction, i.e. in the direction of drawing. Such tapes of a drawn polymer may be produced by drawing said tapes, preferably by uniaxial drawing if unidirectional tapes are to be produced and which will exhibit anisotropic mechanical properties.

Weaving of tapes and in particular of unidirectional tapes of drawn polymer is known per se, for instance from WO2006/075961, the content of which is incorporated herein by reference. WO2006/075961 describes a method for producing a woven material from tape-like warps and wefts comprising the steps of feeding tape-like warps to aid shed formation and fabric take-up; inserting tape-like weft in the shed formed by said warps; depositing the inserted tape-like weft at the fabric-fell; and taking-up the produced woven material; wherein said step of inserting the tape-like weft involves gripping a weft tape in an essentially flat condition by means of clamping, and pulling it through the shed. The inserted weft tape is preferably cut off from its supply source at a predetermined position before being deposited at the fabric-fell position. While weft tensioning is a necessary condition for processing yarns, it is not desirable when processing tapes. The weaving method and apparatus, as disclosed in WO2006/075961 therefore allows to feed and process tape-like warps in a state of low tension. This is achieved by carrying out weaving in a vertical format because this way the sagging of warps and wefts due to gravity is significantly reduced.

Weaving is conventionally carried out on yarns, having a circle-like cross-section. The conventional weaving elements which directly interact with the yarns, such as heald-wires, reed and weft transporting means often cannot be employed when weaving tapes, since such conventional elements are designed to handle yarns. Their use in handling tapes will lead to deformation and weakening of the tapes. When weaving tapes and in particular unidirectional tapes therefore, specially designed weaving elements are used. Particularly suitable weaving elements are described in U.S. Pat. No. 6,450,208, the content of which is also incorporated in the present application by reference.

The invention further relates to a polymeric tape having a width that varies less than 2% on average in the longitudinal direction of the tape. Preferably, said tape is a tape of a drawn polymer, more preferably, said tape is a unidirectional tape of a drawn polymer.

It was observed that by carefully controlling the width variation of the polymeric tapes of the invention, a material sheet is obtained with at least similar properties, in particular antiballistic properties, as the known material, or other commercially available materials based on unidirectionally aligned PE fibers.

In addition, the material sheet according to the invention is readily produced. The conventional material sheet, as described in EP 1627719 A1 for instance, is produced by first making a monolayer of a plurality of tapes positioned adjacent to each other, and then applying another similar monolayer at an angle on top of the first monolayer. To give the material handling characteristics, adjacently positioned tapes overlap at least partly along their side edges. This process is time consuming and involves more steps than the process to make the material structure of the present invention. With the tapes of the invention, an overlapping of the tapes is not necessary for obtaining a material sheet with at least similar properties or handling characteristic, reducing therefore the number of processing steps. In particular the tape-overlapping step can be dispensed with.

The material sheet of the invention is preferably produced by weaving a plurality of the unidirectional tapes of the invention with their longitudinal edges as close as possible to each other, and preferably in touching proximity. This is made possible by using unidirectional tapes having a width that varies less than 2% on average in the longitudinal direction of the tape, as is required by the invention. However, in order to be able to produce the material sheet of the invention on an industrial scale at economical speeds, it would be desirable to allow a gap between adjacent tapes (i.e the adjacent tapes in the material sheets are not in contact along their longitudinal edges—i.e. a gap of greater than 0%). Preferably, the material sheet according to the invention is characterized in that the woven sheet comprises a plurality of unidirectional tapes of the drawn polymer in the warp and weft direction, and in that the gap between adjacent tapes in the weft and/or warp direction is smaller than 10% of the width of the adjacent unidirectional tapes, more preferably smaller than 5% of the width of the adjacent unidirectional tapes, even more preferably smaller than 3% of the width of the adjacent unidirectional tapes. Most preferably said gap is smaller than 1% provided that the inventive tapes have a width variation also smaller than 1% on average in the longitudinal direction of the tape.

In a preferred embodiment the tapes of the invention have a width varying less than 1% on average in the longitudinal direction of the tape. In an even further preferred embodiment the tapes have a width of at least 10 mm, more preferably at least 20 mm, most preferably at least 40 mm and further having a variation in width which is less than 1% on average in the longitudinal direction of the tape. It was observed that a material sheet based on the tapes of this embodiment yields an even better antiballistic performance.

A particularly preferred embodiment of the tape according to the invention is characterized in that the polymer from which it is made is selected from the group consisting of polyolefins, polyesters, polyvinyl alcohols, polyacrylonitriles, polyamides, especially poly(p-phenylene teraphthalamide), liquid crystalline polymers and ladder-like polymers, such as polybenzimidazole or polybenzoxazole, especially poly(1,4-phenylene-2,6-benzobisoxazole), or poly(2,6-diimidazo[4,5-b-4',5'-e]pyridinylene-1,4-(2,5-dihydroxy)phenylene). Unidirectional tapes from these polymers are preferably highly oriented, i.e. having a crystallinity as measured by DSC of above 90%, by drawing the formed material, for instance films, at a suitable temperature.

An even more preferred embodiment of the tape according to the invention is characterized in that the polymer from which it is made is selected from the group consisting of polyolefins, polyesters, polyvinyl alcohols, polyacrylonitriles, and polyamides. The material sheets comprising these tapes can be very well consolidated.

The material sheet of the invention allows the use of tapes of drawn polymers, or simply drawn tapes, with relatively low strength, and therefore does not expressly need high strength drawn tapes made of e.g. ultra high molecular weight polyethylene to obtain good antiballistic performance. However, in a preferred embodiment thereof the tapes of the invention comprise ultra high molecular weight polyethylene. The ultra high molecular weight polyethylene may be linear or branched, although preferably linear polyethylene is used. Linear polyethylene is herein understood to mean polyethylene with less than 1 side chain per 100 carbon atoms, and preferably with less than 1 side chain per 300 carbon atoms; a side chain or branch generally containing at least 10 carbon atoms. Side chains may suitably be measured by FTIR on a 2 mm thick compression moulded film, as mentioned in e.g. EP 0269151. The linear polyethylene may further contain up to 5 mol % of one or more other alkenes that are copolymerisable therewith, such as propene, butene, pentene, 4-methylpentene, octene. Preferably, the linear polyethylene is of high molar mass with an intrinsic viscosity (IV, as determined on solutions in decalin at 135° C.) of at least 4 dl/g; more preferably of at least 8 dl/g, most preferably of at least 10 dl/g. Such polyethylene is also referred to as ultra high molecular weight polyethylene. Intrinsic viscosity is a measure for molecular weight that can more easily be determined than actual molar mass parameters like Mn and Mw. A polyethylene film of this type yields particularly good antiballistic properties.

The tapes according to the invention may be prepared in the form of films which is subsequently slit into tapes.

A preferred first process for the preparation of the tape of the invention comprises forming a polymeric powder bed, compression-moulding the polymeric powder bed at a temperature below the melting point of the polymeric powder, and preferably drawing the compression-moulded polymer, and wherein the powder bed is moulded by compression together with at least one compressible bordering means positioned onto the powder bed. The invention also relates to such a process.

Preferably, the powder bed is compression-moulded together with at least two parallel compressible bordering means, said means defining in the powder bed an in-boundary part and an out-of-boundary part or parts. The melting point of the polymeric powder, also called melting temperature is determined by DSC as detailed below.

By compressible bordering means it is understood means made of a compressible material, said means partitioning the powder bed into at least two parts. By compressible is meant that the means do not substantially interfere with the compression moulding of the polymeric powder bed. In a preferred embodiment, the compressible bordering means are compressible strips. In particular, the undeformed strips typically only take a negligible part of the compressive pressure produced by the compression means of the compression-moulding device, preferably less than 5%, more preferably less than 2%, most preferably less than 1%. The strips act as a firm boundary for the polymeric powder and it has turned out that the use of said strips provides for a polymeric powder bed that is well controlled and of substantially uniform distribution, at least between the boundaries formed by the at least two strips.

The compressible bordering means and in particular the strips, may be manufactured from any material that is flexible enough to provide for the desired compressibility. Preferred materials include thermoplastic polymers, of which polyolefins, such as polypropylene are particularly preferred. Another particularly preferred material comprises a rubber polymer, and more preferably a high temperature resistant rubber polymer, such as a silicon rubber. The means, e.g. strips, are preferably made of a material having a melting temperature as determined by DSC of at least 10° C., more preferably at least 20° C., and most preferably at least 30° C. higher than the melting temperature of the polymeric powder.

Said means, and in particular the strips, may have any shape. It is possible for the means, e.g. strips, to for instance have a rectangular, triangular, circular, or polygonal cross-section, whereby the means or strips can be solid or hollow. Preferably, strips are used that are hollow since such strips are easily compressible. In a particularly preferred process according to the invention, the strips comprise a hose, or a tube. The undeformed height of the means, e.g. strips, can be varied within large boundaries. The undeformed height of the means, e.g. strips, is preferably equal or higher than the undeformed average thickness of the polymeric powder bed. In the event of a hollow strip such as e.g. hose or a tube, the ratio of outer diameter inner diameter preferably is 3:2, more preferably 3:1.5 and even more preferably 3:1.

It is also possible, according to the invention to provide strips within the polymeric powder bed having a lower undeformed height than the undeformed average thickness of the polymeric powder bed. Such strips result in embossed tapes having locally decreased thickness.

In a preferred embodiment of the process of making the tapes of the invention, the compression-moulding process is carried out according to the process of U.S. Pat. No. 5,091,133, the disclosure thereof being included herein by reference. Therefore, the invention relates to a process for the preparation of a polymeric tape, the process comprising feeding a polymeric powder between a combination of endless belts thus forming a polymeric powder bed, compression-moulding the polymeric powder bed at a temperature below the melting point of the polymeric powder, conveying the resultant compression-moulded polymer between the endless belts and preferably drawing the compression-moulded polymer, wherein at least two strips of compressible material are fed and conveyed between the endless belts together with the polymeric powder. According to this preferred embodiment, it is essential that the strips are compressible, at least in their undeformed state, by which is meant that the strips do not substantially interfere with the compression moulding of the polymeric powder bed.

Figure 2:
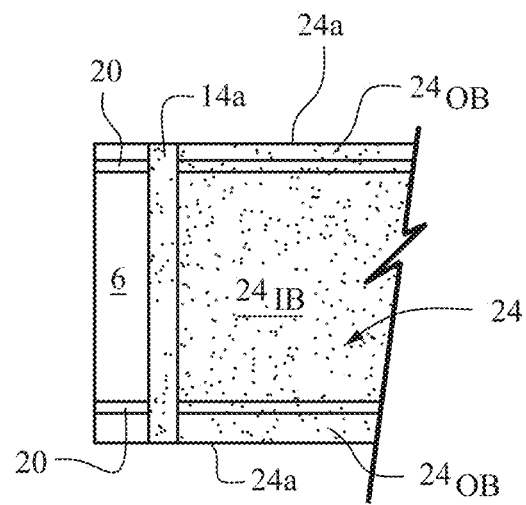
FIG. 2 is a partial plan view of the apparatus depicted schematically in FIG. 1 as taken along lines 2-2 therein.

Schematic illustrations of an apparatus that may be employed in the practice of the process according to the invention is shown in FIGS. 1 and 2. In this regard, it will be observed that the apparatus is basically constructed of a combination of endless belts 5, 6 disposed taut in an up-and-down opposing relation by rolls 1-4, and a pressing assembly having pressing platens 7 for pressing the powder bed via the endless belts 5,6 and two sets of rollers 8 with chains 9. A heater (not shown) may be arranged within each of the pressing platens 7.

A pair of compressible strips 20 that are arranged substantially parallel to each other in the conveying direction are fed onto the endless belt 6. The strips 20 are arranged in such a way that the width of the resulting tape varies less than 2% on average in the longitudinal direction of the tape. This may suitably be done by e.g. a creating a fixed distance between the strips 20 by feeding the strips through a rack 22 with a predefined width for the strips 20. Preferably two of such racks 22 are present for best alignment of the strips, e.g. such racks 22 are present before and after a conveying section. More preferably the strips 20 are fed through the rack 22 while under tension for alignment. The required tension can be easily be determined by routine experimentation, whereby too high a tension could lead to excessive deformation of the strips 20 and too low a tension will not result in a tape with less than 2% variation of width. An alternative method could be electronically controlled width-gauges between and guiding the strips.

According to the embodiment depicted in FIGS. 1 and 2, the polymeric powder 14a is fed or scattered by hopper 14 onto the belt 6 over some width, whereby the width is generally larger than the distance between the strips 20 thereby forming a powder bed 24 having outer edges 24a. The powder bed 24 therefore overlaps with the strips 20. In other words, the strips 20 are arranged such that they extend within the polymeric powder bed 24 along the outer edges 24a thereof, and at some distance from the outer edges 24a. The polymeric powder bed 24 is in this way divided in a part that is in-boundary and extends between the strips (noted by numeral $24_{IB}$), and in a part that is out-of-boundary (noted by numeral $24_{OB}$), the latter part extending from the strips 20 to the outer edges 24a of the powder bed 24. A preheater 12 may be provided so as to preheat the powder bed 24 to a predetermined temperature prior to being compressed between the rolls 5, 6.

Following compression moulding by the platens 7, the compression-moulded out-of-boundary parts $24_{OB}$ of the powder bed 24 may be removed from the compression moulded in-boundary part $24_{IB}$, to allow the latter be collected and/or further processed into a material sheet as the resulting product (shown schematically by block 30 in FIG. 1) while the latter can be recycled for further use (shown schematically by block 32 in FIG. 1). Such process therefore offers the possibility to produce a polymeric tape substantially without waste.

A further particularly preferred embodiment of the process of making the tapes of the invention is characterized in that the number of strips 20 is 2, and are used to create an in-boundary part $24_{IB}$ between these 2 strips and an out-of boundary part or parts $24_{OB}$, whereby the strips 20 are arranged such that they longitudinally extend within the polymeric powder bed 24 along the outer edges 24a of the bed 24 such that the width of the out-of boundary part(s) $24_{OB}$ of the powder bed 24 does not exceed 30% of the total width of the powder bed 24. When scattering polymeric powder onto e.g. a belt 6, the side regions thereof will generally show a variation in thickness, the thickness decreasing towards the sides of the powder bed. It has turned out that by positioning the strips 20 according to this embodiment, i.e. such that the width of the out-of boundary part(s) $24_{OB}$ of the powder bed 24 does not exceed 30% of the total width of the powder bed 24, the in-boundary part $24_{IB}$ of the powder bed will have a substantially uniform thickness. With the "width of the out-of-boundary parts" is meant the total width of the out-of-boundary part or parts $24_{OB}$. It is believed that the more uniform thickness of the in-boundary part $24_{IB}$ of the powder bed 24 is responsible for the observed improved properties of the final polymeric tape.

In an even more preferred embodiment of the process of making the tapes of the invention, the strips are positioned at a distance from the outer edges of the polymeric powder bed of at most 20% of the total width of the polymeric powder bed, and most preferred at a distance from the outer edges of the polymeric powder bed of at most 10% of the total width of the polymeric powder bed.

If desired, prior to feeding and compression-moulding the polymer powder, the polymer powder may be mixed with a suitable liquid organic compound having a boiling point higher than the melting point of said polymer. Compression moulding is preferably carried out by temporarily retaining the polymer powder between the endless belts while conveying. This may for instance be done by providing pressing platens and/or rollers in connection with the endless belts. The UHMWPE polymer used in this process is preferably drawable in the solid state.

Drawing, preferably uniaxial drawing, of the compression moulded polymer may be carried out by means known in the art. Such means comprise extrusion stretching and tensile stretching on suitable drawing units. To attain increased mechanical strength and stiffness, drawing may be carried out in multiple steps. In case of the preferred ultra high molecular weight polyethylene films, drawing is typically carried out uniaxially in a number of drawing steps. The first drawing step may for instance comprise drawing to a stretch factor of 3. Multiple drawing may typically result in a stretch factor of 9 for drawing temperatures up to 120° C., a stretch factor of 25 for drawing temperatures up to 140° C., and a stretch factor of 50 for drawing temperatures up to and above 150° C. By multiple drawing at increasing temperatures, stretch factors of about 50 and more may be reached.

Since the polymeric tape of the invention is produced by providing clear boundaries for the polymeric powder bed, e.g. in the form of the easily compressible strips, the tape is more uniform than known hitherto, in particular in the transverse direction of the tape as produced. Polymeric tape of the invention may be obtained having further an areal weight varying less than 10% on average in the transverse direction of the tape, and preferably less than 5% on average in the transverse direction of the tape. Such more uniform tapes provide better, or at least more consistent mechanical properties than the known tapes.

A preferred second process for the formation of films or tapes comprises feeding a polymer to an extruder, extruding a film or a tape at a temperature above the melting point thereof and drawing the extruded film or tape. If desired, prior to feeding the polymer to the extruder, the polymer may be mixed with a suitable liquid organic compound, for instance to form a gel, such as is preferably the case when using ultra high molecular weight polyethylene. Preferably the polyethylene films are prepared by such a gel process. A suitable gel spinning process is described in for example GB-A-2042414, GB-A-2051667, EP 0205960 A and WO 01/73173 A1, and in "Advanced Fibre Spinning Technology", Ed. T. Nakajima, Woodhead Publ. Ltd (1994), ISBN 185573 182 7. In short, the gel spinning process comprises preparing a solution of a polyolefin of high intrinsic viscosity, extruding the solution into a film at a temperature above the dissolving temperature, cooling down the film below the gelling temperature, thereby at least partly gelling the film, and drawing the film before, during and/or after at least partial removal of the solvent.

Drawing, preferably uniaxial drawing, of the produced films or tapes may be carried out by means known in the art. Such means comprise extrusion stretching and tensile stretching on suitable drawing units. To attain increased mechanical strength and stiffness, drawing may be carried out in multiple steps. In case of the preferred ultra high molecular weight polyethylene films, drawing is typically carried out uniaxially in a number of drawing steps. The first drawing step may for instance comprise drawing to a stretch factor of 3. Multiple drawing may typically result in a stretch factor of 9 for drawing temperatures up to 120° C., a stretch factor of 25 for drawing temperatures up to 140° C., and a stretch factor of 50 for drawing temperatures up to and above 150° C. By multiple drawing at increasing temperatures, stretch factors of about 50 and more may be reached. This results in high strength tapes, whereby for tapes of ultra high molecular weight polyethylene, strengths of 1.5 GPa to 1.8 GPa and more may be obtained.

According to the invention, the resulting tapes, preferably the resulting drawn tapes, may be used as such to produce the material sheet by weaving, if their variation in width is less than 2% on average in the longitudinal direction of the tape, and preferably less than 1% on average in the longitudinal direction of the tape. Alternatively, the tapes and in particular the drawn tapes as produced may be cut to their desired width, or split along the direction of drawing, to obtain the limited width variation as required by the invention. Preferably the material sheet is woven from tape that is not slitted e.g. to form fiber like structures as disclosed in U.S. Pat. No. 5,091,133.

The width of the tapes of the invention and in particular the width of the unidirectional tapes, is only limited by the width of the film from which they are produced. The width of the tapes preferably is more than 2 mm, preferably more than 5 mm, more preferably more than 10 mm, even more preferably more than 20 mm. Most preferably the width of the tapes is more than 40 mm. It was observed that wider tapes perform better when woven into material sheets and furthermore, material sheets comprising wider tapes have further improved properties, in particular antiballistic properties, especially when the width of the tapes is more than 40 mm. In principle there is no restriction to the maximum width of the tape. For practical reasons the preferred maximum width is at most 400 mm, more preferably at most 300 mm, most preferably at most 200 mm.

The areal density of the tapes of the invention can be varied over a large range, for instance between 5 and 200 $g/m^2$. Preferred areal density is between 8 and 120 $g/m^2$, more preferred between 10 and 80 $g/m^2$ and most preferred between 12 and 60 g/m², most preferred between 12 and 30 g/m². The areal density of a tape can be determined by weighing a conveniently cut surface from the tape. It was observed that material sheets made of such tapes have improved antiballistic performance.

The thickness of the tapes of the invention, in particular the unidirectional tapes, can in principle be selected within wide ranges. Preferably however, the thickness of the tapes used in weaving the material sheet of the invention does not exceed 120 μm, more preferably does not exceed 50 μm, and most preferably is comprised between 5 and 29 μm. A further preferred material sheet according to the invention is characterized in that the thickness of the tapes used to manufacture thereof is greater than 10 μm and does not exceed 50 μm, preferably does not exceed 100 μm and more preferably does not exceed 120 μm. By limiting the thickness of the tapes in a material sheet to the claimed thicknesses, sufficient antiballistic properties are surprisingly achieved even with tapes having rather limited strengths. The skilled person knows how to determine the thickness of the tape, e.g. with a micrometer.

The strength of the tapes of the invention, in particular the tapes in the material sheet, largely depends on the polymer from which they are produced, and on their (uniaxial) drawing or draw ratio. The strength of the tapes is at least 0.75 GPa, preferably at least 0.9 GPa, more preferably at least 1.2 GPa, even more preferably at least 1.5 GPa, even more preferably at least 1.8 GPa, and even more preferably at least 2.1 GPa, and most preferably at least 3 GPa. The unidirectional tapes are preferably sufficiently interconnected to each other, meaning that the material sheets according to the invention hardly delaminate under normal use conditions such as e.g. at room temperature.

The material sheet according to the invention may comprise tapes woven into e.g. fabrics of any structure. Suitable woven fabric structures may include plain weave, twill weave, basket weave, satin weave, crowfoot weave, and others. Particularly preferred is a material sheet, wherein the woven fabric has a plain weave structure. Such a structure offers a stable material sheet, which is easily processed further. Also, this embodiment shows excellent antiballistic performance, especially in a stand-alone configuration. Another preferred embodiment of the material sheet comprises a woven fabric having a twill weave structure. Such an embodiment is preferred in ballistic resistant articles, comprising material sheets of the invention and a further sheet of inorganic material selected from the group consisting of ceramic, steel, aluminum, magnesium titanium, nickel, chromium and iron or their alloys, glass and graphite, or combinations thereof. The present embodiment preferably comprises a twill weave structure with an interlacing frequency ranging from 3-30:1, and more preferably ranging from 7-21:1. An interlacing frequency of x:1 means that a warp (or weft yarn) crosses over x weft (or warp) yarns.

The material sheet of the invention may also include a binder which is locally applied to bond and stabilise the plurality of the tapes, in particular unidirectional tapes used in manufacturing thereof, such that the structure of the material sheet is retained during handling and producing of structures, e.g. antiballistic structures. Suitable binders are described in e.g. EP 0191306 B1, EP 1170925 A1, EP 0683374 B1 and EP 1144740 A1. The binder may be applied in various forms and ways; for example as a transverse bonding strip (transverse with respect to the e.g. unidirectional tapes). The application of the binder during the formation of the material sheet advantageously stabilises the tapes, thus enabling faster production cycles to be achieved.

In one embodiment, a binder is applied to fixedly abut adjacent unidirectional tapes along their longitudinal edges. As the role of the binder is to temporarily retain and stabilise the plurality of unidirectional tapes during handling and making of material sheets, e.g. antiballistic material sheets, localised application of the binder is preferred. Local application of the binder is application that is restricted to the immediate vicinity of the longitudinal edges and may include intermittent localised application (spot application along the longitudinal edges).

In still another preferred embodiment of the material sheet according to the invention, the unidirectional tapes in the weft and/or warp direction are mutually bonded, at least over an area adjacent to the longitudinal edges of the woven fabric. In a particularly preferred embodiment, the unidirectional tapes of the drawn polymer in the warp and weft direction of the woven fabric are at least partly adhered to each other, at least over an area adjacent to the longitudinal edges of the woven fabric by fusion bonding. In this embodiment, welding may be used for instance to intermittently fuse sections of the longitudinal edges of the material sheet together.

In embodiments with intermittent localised fusion of the unidirectional tapes in the weft and/or warp direction, the proportion of the longitudinal edges of the material sheet comprising intermittent localised fusion is preferably less than 50%, 30%, 20% 10%, 5% or 2%. When using a binder, the proportion of the longitudinal edges (or areas adjacent to the longitudinal edges) of the material sheet which is raised due to the application of the binder is preferably less than 50%, 30%, 20% 10%, 5% or 2%. Preferably, the binder comprises less than 20%, 10%, 5%, 2% 1%, 0.5%, or 0.2% of the weight of the material sheet.

The material sheet according to the invention can be used in the form of one woven structure, e.g. fabric, as produced. However, it is also possible to provide a multilayered material sheet by stacking a plurality of material sheets according to the invention (e.g. woven fabrics). Such a multilayered material sheet preferably comprises at least 2 woven fabrics, preferably at least 4 woven fabrics, more preferably at least 6 woven fabrics, even more preferably at least 8 woven fabrics, and most preferably at least 10 woven fabrics. Increasing the number of woven fabrics in the multilayer material sheet of the invention simplifies the manufacture of articles from these material sheets, for instance antiballistic plates.

The material sheet according to the invention is particularly useful in manufacturing ballistic resistant articles, such as vests or armoured plates. Particularly good results are obtained when drawn tapes, preferably unidirectional tapes according to the invention are used in manufacturing the material sheet. Ballistic applications comprise applications with ballistic threat against projectiles of several kinds including against armor piercing, so-called AP bullets and hard particles such as e.g. fragments and shrapnel. The material sheet according to the invention is most suitable for use in hard ballistics, such as e.g. panels, for use in vehicles for land/air or sea, or panels for inserts in bullet resistant vests. The invention therefore also relates to the enumerated ballistic resistant articles comprising the material sheet of the invention.

The ballistic resistant article according to the invention comprises at least 1 woven fabric layer, preferably at least 5 woven fabric layers, more preferably at least 10 woven fabric layers, even more preferably at least 15 woven fabric layers and most preferably at least 20 woven fabric layers.

Preferably the ballistic resistant article according to the invention comprises a further sheet of inorganic material selected from the group consisting of ceramic; metal; glass; graphite, or combinations thereof. Particularly preferred is metal and in particular a metal having a melting point of at least 350° C., more preferably at least 500° C., most preferably at least 600° C. Suitable metals include aluminum, magnesium, titanium, copper, nickel, chromium, beryllium, iron and copper including their alloys as e.g. steel and stainless steel and alloys of aluminum with magnesium (so-called aluminum 5000 series), and alloys of aluminum with zinc and magnesium or with zinc, magnesium and copper (so-called aluminum 7000 series). In said alloys the amount of e.g. aluminum, magnesium, titanium and iron preferably is at least 50 wt %. Preferred metal sheets comprising aluminum, magnesium, titanium, nickel, chromium, beryllium, iron including their alloys. More preferably the metal sheet is based on aluminum, magnesium, titanium, nickel, chromium, iron and their alloys. This results in a light antiballistic article with a good durability. Even more preferably the iron and its alloys in the metal sheet have a Brinell hardness of at least 500. Most preferably the metal sheet is based on aluminum, magnesium, titanium, and their alloys. This results in the lightest antiballistic article with the highest durability. Durability in this application means the lifetime of a composite under conditions of exposure to heat, moisture, light and UV radiation. Although the further sheet of material may be positioned anywhere in the stack of woven fabric layers, the preferred ballistic resistant article is characterized in that the further sheet of material is positioned at the outside of the stack of woven fabric layers, most preferably at least at the strike face thereof.

The ballistic resistant article according to the invention preferably comprises a further sheet of the above described inorganic material having a thickness of at most 100 mm. Preferably the maximum thickness of the further sheet of inorganic material is 75 mm, more preferably 50 mm, and most preferably 25 mm. This results in the best balance between weight and antiballistic properties. Preferably, in the event that the further sheet of inorganic material is a metal sheet, the thickness of the metal sheet, is at least 0.25 mm, more preferably at least 0.5 mm, and most preferably at least 0.75 mm. This results in even better antiballistic performance.

The further sheet of inorganic material may optionally be pre-treated in order to improve adhesion with the multilayer material sheet. Suitable pre-treatment of the further sheet includes mechanical treatment e.g. roughening or cleaning the surface thereof by sanding or grinding, chemical etching with e.g. nitric acid and laminating with polyethylene film.

In another embodiment of the ballistic resistant article a bonding layer, e.g. an adhesive, may be applied between the further sheet and the multilayer material sheet. Such adhesive may comprise an epoxy resin, a polyester resin, a polyurethane resin or a vinylester resin. In another preferred embodiment, the bonding layer may further comprise a woven or non woven layer of inorganic fiber, for instance glass fiber or carbon fiber. It is also possible to attach the further sheet to the multilayer material sheet by mechanical means, such as e.g. screws, bolts and snap fits. In the event that the ballistic resistant article according to the invention is used in ballistic applications where a threat against AP bullets, fragments or improvised explosive devices may be encountered the further sheet is preferably comprises a metal sheet covered with a ceramic layer. In this way an antiballistic article is obtained with a layered structure as follows: ceramic layer/metal sheet/at least two unidirectional sheets with the direction of the fibers in the unidirectional sheet at an angle α to the direction of the fibers in an adjacent unidirectional sheet. Suitable ceramic materials include e.g. alumina oxide, titanium oxide, silicium oxide, silicium carbide and boron carbide. The thickness of the ceramic layer depends on the level of ballistic threat but generally varies between 2 mm and 30 mm. This ballistic resistant article is preferably positioned such that the ceramic layer faces the ballistic threat.

In one embodiment of the present invention, there is provided a process for the manufacture of a ballistic resistant article comprising:
(a) stacking at least 1 woven fabric layer of unidirectional tapes of drawn polymer, wherein the width of a tape varies less than 2% on average in the longitudinal direction of the tape; and a sheet of material selected from the group consisting of ceramic, steel, aluminum, titanium, glass and graphite, or combinations thereof; and
(b) consolidating the stacked sheets under temperature and pressure.

In an alternative process a stack of at least 2 woven fabric layers of unidirectional tapes of drawn polymer, wherein the width of a tape varies less than 2% on average in the longitudinal direction of the tape is manufactured in a separate process, such as has been described above. This pre-manufactured stack is then combined with the further sheet of material selected from the group consisting of ceramic, steel, aluminum, titanium, glass and graphite, or combinations thereof, in step (a) of the process.

Consolidation for all processes described above may suitably be done in a hydraulic press. Consolidation is intended to mean that the monolayers are relatively firmly attached to one another to form one unit. The temperature during consolidating generally is controlled through the temperature of the press. A minimum temperature generally is chosen such that a reasonable speed of consolidation is obtained. In this respect 80° C. is a suitable lower temperature limit, preferably this lower limit is at least 100° C., more preferably at least 120° C., most preferably at least 140° C. A maximum temperature is chosen below the temperature at which the drawn polymer woven layers lose their high mechanical properties due to e.g. melting. Preferably the temperature is at least 10° C., preferably at least 15° C. and even more at least 20° C. below the melting temperature of the drawn polymer woven layer. In case the drawn polymer woven layer does not exhibit a clear melting temperature, the temperature at which the drawn polymer woven layer starts to lose its mechanical properties should be read instead of melting temperature. In the case of the preferred ultra high molecular weight polyethylene, a temperature below 145° C. generally will be chosen. The pressure during consolidating preferably is at least 7 MPa, more preferably at least 15 MPa, even more preferably at least 20 MPa and most preferably at least 35 MPa. In this way a stiff antiballistic article is obtained. The optimum time for consolidation generally ranges from 5 to 120 minutes, depending on conditions such as temperature, pressure and part thickness and can be verified through routine experimentation. In the event that curved antiballistic articles are to be produced it may be advantageous to first pre-shape the further sheet of material into the desired shape, followed by consolidating with the monolayers and/or multilayer material sheet.

Preferably, in order to attain a high ballistic resistance, cooling after compression moulding at high temperature is carried out under pressure as well. Pressure is preferably maintained at least until the temperature is sufficiently low to prevent relaxation. This temperature can be established by one skilled in the art. When a ballistic resistant article comprising monolayers of ultra high molecular weight polyethylene is manufactured, typical compression temperatures range from 90 to 150° C., preferably from 115 to 130° C. Typical compression pressures range between 100 to 300 bar, preferably 100 to 180 bar, more preferably 120 to 160 bar, whereas compression times are typically between 40 to 180 minutes.

The multilayered material sheet and antiballistic article of the present invention are particularly advantageous over previously known antiballistic materials as they provide at least the same level of protection as the known articles at a significantly lower weight, or an improved ballistic performance at equal weight compared with the known article. Starting materials are inexpensive and the manufacturing process is relatively short and thus cost effective. Since different polymers may be used to produce the multilayered material sheet of the invention properties may be optimized according to the particular application. Besides ballistic resistance, properties include for instance heat stability, shelf-life, deformation resistance, bonding capacity to other material sheets, formability, and so on.

It was also observed that the material sheet of the invention and the particular constructions comprising said sheet as described above in the embodiments of the multilayered material sheet and of the ballistic resistant articles, are products particularly useful also in manufacturing cargo panels, i.e. panels used in the construction of cargo containers. Said products proved also particularly advantageous in manufacturing construction walls; liners for e.g. cargo holds such as aircraft cargo holds; cargo pallet sheets and radomes. Furthermore, said products and in particular the constructions of multilayered material sheets and ballistic resistant articles proved extremely useful when used to manufacture impact sensitive aircraft parts, e.g. wing edges, flaps or other prominent parts which are prone to suffer impacts from e.g. ice or birds. The invention therefore relates to the use of the material sheet of the invention in the above enumerated products and furthermore to the above enumerated products comprising the material sheet of the invention.

Figure 3:
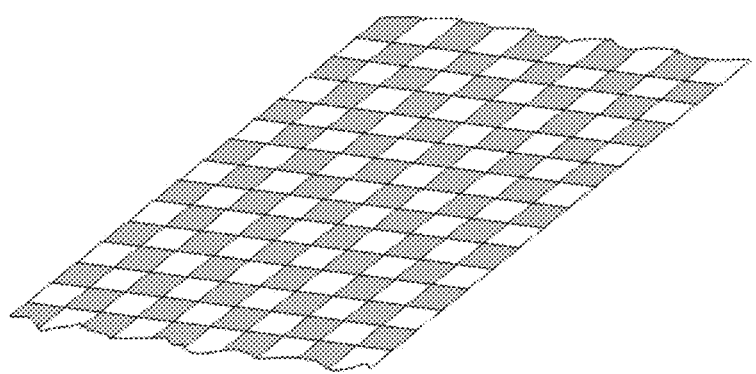
FIG. 3 schematically represents an embodiment of a material sheet according to the invention.

Referring to FIG. 3, a woven fabric of unidirectional tapes of drawn polymer is shown. In the woven fabric, the width of the tapes of at least 10 mm varies less than 2% on average in the longitudinal direction of the tapes. The woven fabric has been obtained by a weaving process as described in WO2006/075961. After weaving the tapes according to a plain weave pattern (as shown in FIG. 3), the woven fabric is fed into a belt press or calander press, known per se, for final consolidation of the material sheet. In the belt press or calander, the unidirectional tapes running in the warp and weft direction are bonded at a temperature close to the melting point of the tapes. It should be noted that tapes of at least 10 mm can be produced having a width varying less than 2% on average in the longitudinal direction of the tapes by drawing polymer films. In instances where this is not possible, a tape as produced is subsequently slitted along its longitudinal edges to obtain the limited variation in width, as required by the invention. Suitable slitting equipment is for instance a Bielloni Sage machine, model Taglierina, type RP/B1 505, equipped with chromium steel knives.

Figure 4:
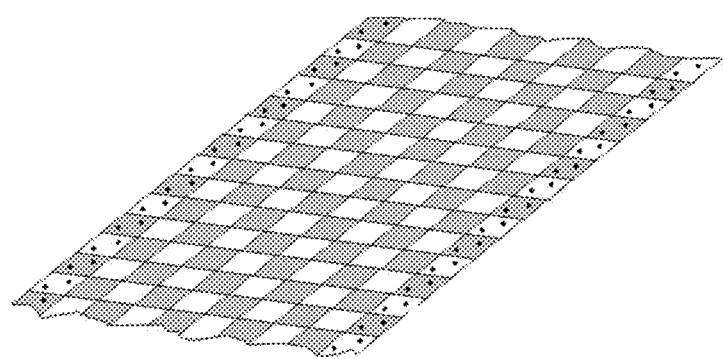
FIG. 4 schematically represents another embodiment of a material sheet according to the invention.

Referring to FIG. 4, another embodiment of a woven fabric of unidirectional tapes of drawn polymer is shown. As in FIG. 3, the width of the tapes of at least 10 mm varies less than 2% on average in the longitudinal direction of the tapes. The woven fabric has been obtained by a weaving process as described in WO2006/075961. After weaving the tapes according to a plain weave pattern, the woven fabric has been partly consolidated over an area adjacent to the longitudinal edges of the woven fabric only. The dots shown in FIG. 4 actually represent locations in which the unidirectional tapes have been fusion bonded, for instance by welding.

Figure 5:
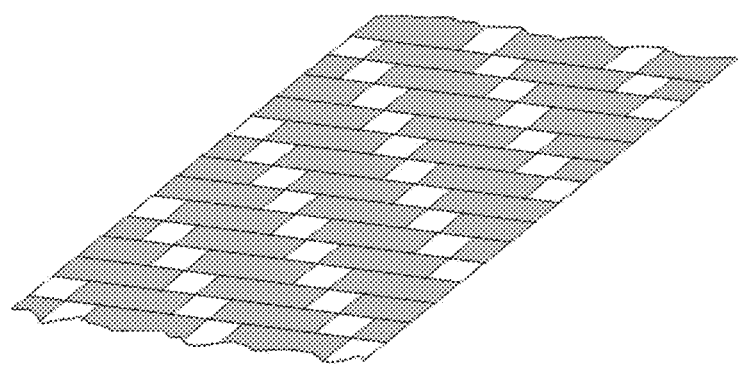
FIG. 5 schematically represents still another embodiment of a material sheet according to the invention.

Referring to FIG. 5, still another embodiment of a woven fabric of unidirectional tapes of drawn polymer is shown. As in the previous FIGS. 3-4, the width of the tapes varies less than 2% on average in the longitudinal direction of the tapes. The woven fabric has been obtained by a weaving process as described in WO2006/075961, and consolidated in a belt press. The woven structure of this embodiment corresponds to a twill weave with an interlacing frequency of 3, i.e. a weft (warp) tape crosses over 3 warp (weft) tapes.

Figure 6:
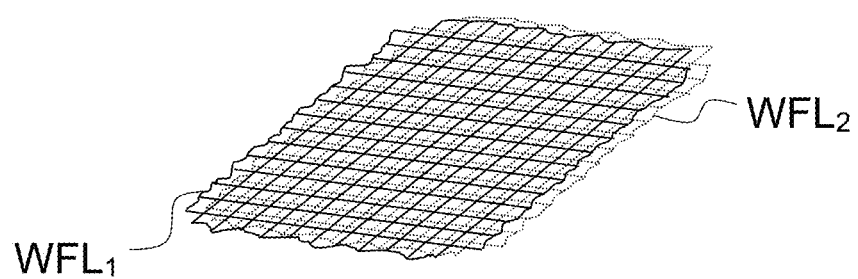
FIG. 6 schematically represents a multilayer material sheet according to the invention.

Referring to FIG. 6, a graphical presentation of a multilayer material sheet according to the invention is shown. The multilayer material sheet comprises a woven fabric layer of FIG. 3 denoted as WFL, (in full lines), with below it a second woven fabric layer denoted as WFL2 (in dotted lines). The second woven fabric layer WFL2 is positioned such that the seam lines of the respective woven fabric layers WFL, and WFL2 are aligned in a staggered fashion.

Test Methods

Test methods as referred to in the present application, are as follows

Intrinsic Viscosity (IV) is determined according to method PTC-179 (Hercules Inc. Rev. Apr. 29, 1982) at 135° C. in decalin, the dissolution time being 16 hours, with DBPC as anti-oxidant in an amount of 2 g/l solution, by extrapolating the viscosity as measured at different concentrations to zero concentration;

Tensile properties of yarn (measured at 25° C.): tensile strength (or strength), tensile modulus (or modulus) and elongation at break (or eab) are defined and determined on multifilament yarns as specified in ASTM D885M, using a nominal gauge length of the fiber of 500 mm, a crosshead speed of 50%/min. Tensile properties of tape (measured at 25° C.): tensile strength (or strength), tensile modulus (or modulus) and elongation at break (or eab) are defined and determined on tapes of a width of 20 mm as specified in ASTM D882, using a nominal gauge length of the tape of 440 mm, a crosshead speed of 50 mm/min.

Width variation of the tape, is determined by measuring the largest width L and the smallest width S of a tape of a length of 20 m (or alternatively 20 tapes of a length of 1 m). The variation is L-S devided by S, expressed as percentage.

The melting point of a polymer is determined by DSC on a power-compensation PerkinElmer DSC-7 instrument which is calibrated with indium and tin with a heating rate of 10° C./min. For calibration (two point temperature calibration) of the DSC-7 instrument about 5 mg of indium and about 5 mg of tin are used, both weighed in at least two decimal places. Indium is used for both temperature and heat flow calibration; tin is used for temperature calibration only.

The furnace block of the DSC-7 is cooled with water, with a temperature of 4° C. in order to provide a constant block temperature, for a stable baselines and good sample temperature stability. The temperature of the furnace block should be stable for at least one hour before the start of the first analysis. For tape measurements, the tape is cut into small square pieces of 5 mm maximum and a sample size of at least about 1 mg (+/−0.1 mg) is taken. Typically, for a tape with a thickness of 40 micron, one square piece of 5 mm is about 1 mg. For smaller thicknesses more pieces are stacked. For thicker tapes the size may be reduced, such that 1 mg sample mass is obtained at minimum.

The representative sample is put into an aluminum DSC sample pan (50 μl), which is covered with an aluminum lid (round side up) and then sealed. In the sample pan (or in the lid) a small hole must be perforated to avoid pressure build-up (leading to pan deformation and therefore a worsening of the thermal contact). For powder samples, a minimum of 1 mg (+/−0.1 mg) of powder is taken and charged into the sample pan.

The sample pan is placed in a calibrated DSC-7 instrument. In the reference furnace an empty sample pan (also covered with a pierced lid and sealed) is placed. The following temperature program is run:
1. sample is kept for 5 min at 40° C. (stabilization period)
2. increase temperature from 40 up to 200° C. with 10° C./min. (first heating curve)
3. sample is kept for 5 min at 200° C.
4. temperature is decreased from 200 down to 40° C. (cooling curve)
5. sample is kept for 5 min at 40° C.
6. optionally increase temperature from 40 up to 200° C. with 10° C./min to obtain a second heating curve.

The same temperature program is run with an empty pan in the sample side of the DSC furnace (empty pan measurement).

Analysis of the first heating curve is used as known in the art to determine the melting temperature of the analyzed sample. The empty pan measurement is subtracted from the sample curve to correct for baseline curvature. Correction of the slope of the sample curve is performed by aligning the baseline at the flat part before and after the peaks (at 60 and 190° C. for UHMWPE). The peak height is the distance from the baseline to the top of the peak.

EXAMPLES

The invention is now further explained by means of the following examples, without being limited hereto.

Example I

Ia—Production of Tape

A ultrahigh molecular weight polyethylene powder as described in WO 93/15118 having a bulk density of 275 kg/m³ and an active catalyst residue of 47 ppm was fed into a powder bed of a width of 30 cm. This bed was heated to a temperature of 135° C. and pressed at a pressure of 35 bar during 1 minute. The obtained tape precursor was calandered at a temperature of 140° C., i.e. below the melting point of the powder, and subsequently drawn to a total draw ratio of 150, to form a tape.

The tape as produced had a tenacity of 1.7 GPa, measured on a small (20 mm) slit tape. The tape had a width of about 60 mm, and was slit to a width of 50.5±0.5 mm, using a Biellloni Sage machine, model Taglierina, type RP/B1 505, equipped with chromium steel knives. Thickness of the tape was 37 μm.

Ib—Production of Woven Fabric Material

The tapes were converted into a woven fabric with a plain weave structure, as shown in FIG. 1. The tape woven structure had a width of 130 cm and was stabilized by fusion at the edges of the product, as shown in FIG. 2. Without stabilizing the "fabric" it tends to fall apart when cutting it into ballistic panel sized sheets. The woven fabric thus produced was then fed to a lamination line (manufactured by Meyer®), which is a belt press having different temperature and pressure zones. The heating zone was set to a temperature of 146° C., followed by coaling. Pressure: 18 N/cm2. Total residence time was 2 minutes.

Ic—Production of Armor Panels from the Tape

Panels were made of size 50×50 cm. A first layer of woven fabric was placed on a surface. A second layer of woven fabric was placed on top of the first layer, and in such fashion that the seam lines of the two layers were positioned in a staggered manner. The procedure was repeated until an areal density (AD) of 8 kg/m² was reached. The stack was then supplemented with commercially available 8 mm AL2O3 tiles (50 mm×50 mm tiles) having a purity of at least 98%. The stack was then moved into a press and pressed at a temperature of 145° C. and a pressure of 165 bar for 40 minutes. Cooling was performed under pressure until a temperature of 80° C. was reached. Total cycle time was about 70 minutes.

Id—Performance Testing of Armored Panels

The armoured plates were subjected to shooting tests performed with 7.62×51 mm AP-M2 (St. Louis Ordnance Plant, Mo., USA) bullets. The tests were performed with the aim of determining the V50 value. V50 is the speed at which 50% of the projectiles will penetrate the armoured plate. The testing procedure was as follows. The first projectile was fired at the anticipated V50 speed. The actual speed was measured shortly before impact. If the projectile was stopped, a next projectile was fired at an intended speed of about 20 m/s higher. If it perforated, the next projectile was fires at an intended speed of about 20 m/s lower. The actual speed of impact was always measured. V50 was the average of the two highest stops and the two lowest perforations.

Comparative Experiment A

Production of Armor Panels

The same procedure was used for the manufacture of the panels of example I whereby instead of the woven fabric Dyneema® HB26 (DSM Dyneema, Netherlands) was used. This is a commercially available material based on crossplied unidirectional polyethylene fibers Performance Testing of Amored Panels Was done in the same way as for Example I.

Results:

| Ex. | Strike face | Backing | V50 m/s |
|---|---|---|---|
| I | 8 mm AL2O3 | 8 kg/m2 plain woven fabric | 888 |
| A | 8 mm AL2O3 | 8 kg/m2 Dyneema ® HB26 | 862 |

The results confirm that a ballistic article comprising a material sheet according to the invention comprising a woven fabric of drawn polyethylene produces unexpectedly improved anti-ballistic performance. This is the more surprising since it is common knowledge that hitherto known woven fabrics show lower ballistic protection that the commercially available products based on crossplied unidirectionally aligned polyethylene fibers. In particular, the ballistic article of the present invention produced a significantly higher V50 value than is known from the prior art.

The invention claimed is:

1. A process for preparing a polymeric tape product having a width that varies less than 2% on average in a longitudinal direction thereof, the process comprising:
   (a) forming a polymeric powder bed on a belt provided with at least two parallel compressible bordering strips such that the powder bed extends between the strips and overlaps the strips so as to define in the powder bed an in-boundary powder bed part and out-of-boundary powder bed part, respectively,
   (b) compression-moulding the in-boundary and out-of-boundary powder bed parts of the polymeric powder bed at a temperature below the melting point of the polymeric powder so as to form a compression molded polymeric tape comprised of a compressed in-boundary polymeric tape part corresponding to the in-boundary powder bed part and a compressed out-of-boundary polymeric tape part corresponding to the out-of-boundary powder bed part; and thereafter
   (c) separating the compressed in-boundary and out-of-boundary polymeric tape parts to thereby provide a polymeric tape product from the compressed in-boundary polymeric tape part.

2. The process according to claim 1, wherein the process further comprises
   (d) drawing the compression-moulded polymeric tape.

3. The process according to claim 2, wherein drawing is carried out in multiple steps.

4. The process according to claim 3, comprising multiple drawing at increasing temperatures.

5. The process according to claim 1, wherein the compression molded polymeric tape is formed of a polymer selected from the group consisting of polyolefins, polyesters, polyvinyl alcohols, polyacrylonitriles, and polyamides.

6. The process according to claim 1, wherein the compression molded polymeric tape comprises ultra high molecular weight polyethylene.

7. The process according to claim 6, wherein the ultra high molecular weight polyethylene polymer is drawable in a solid state.

8. The process according to claim 1, wherein the at least-two parallel compressible bordering strips include at least one compressible strip made of a material having a melting temperature as of at least 10° C. higher than the melting temperature of the polymeric powder as determined by differential scanning calorimetry (DSC).

9. The process according to claim 8, wherein the at least two parallel compressible strips are formed of a thermoplastic polymer.

10. The process according to claim 8, wherein the at least two parallel compressible strips are formed from polypropylene, rubber polymer or silicon rubber.

11. The process according to claim 8, wherein the at least two parallel compressible strips have a rectangular, triangular, circular, or polygonal cross-section.

12. The process according to claim 8, wherein the at least two parallel compressible strips comprise a hose or a tube.

13. The process according to claim 12, wherein the at least two parallel compressible strips have a ratio of outer diameter:inner diameter of 3:2, 3:1.5 or 3:1.

14. The process according to claim 8, wherein the at least two parallel compressible strips have an undeformed height which is equal to or higher than an undeformed average thickness of the polymeric powder bed.

15. A process for making a polymeric tape product comprising:
   (a) providing a belt with at least two parallel compressible bordering tubes that define an inner belt portion and an outer belt portion;
   (b) forming a polymeric powder bed onto both the inner and outer belt portions so that the powder bed extends between and overlaps the bordering tubes to thereby establish an in-boundary powder bed part and an out-of-boundary powder bed part, respectively,
   (c) compression-molding the polymeric powder bed so as to form a compression molded polymeric tape having in-boundary and out-of-boundary compression molded polymeric tape parts corresponding to the in-boundary and out-of-boundary polymeric powder bed parts, respectively; and thereafter
   (c) separating the in-boundary and out-of-boundary compression molded polymeric tape parts so as to provide a polymeric tape product from the in-boundary compression molded polymeric tape part.

16. The process according to claim 15, wherein the at least two parallel compressible tubes have a ratio of outer diameter:inner diameter of 3:2, 3:1.5 or 3:1.

17. The process according to claim 15, wherein the at least two parallel compressible tubes have an undeformed height which is equal to or higher than an undeformed average thickness of the polymeric powder bed.

18. The process according to claim 15, wherein step (d) comprises recycling the out-of-boundary compression molded polymeric tape part.

19. The process according to claim 15, wherein the in-boundary tape part has a variation of width in a longitudinal direction of less than 2%.

20. The process according to claim 15, wherein the polymeric powder bed comprises an ultra high molecular weight polyethylene powder.

21. The process according to claim 15, wherein the compressible tubes are positioned on the belt at a distance from respective outer edges of the polymeric powder bed which is at most 20% of a total width of the polymeric powder bed.

22. The process according to claim 21, wherein the compressible tubes are positioned on the belt at a distance from the respective outer edges of the polymeric powder bed which is at most 10% of the total width of the polymeric powder bed.

* * * * *